Nov. 12, 1968   J. MAURICE   3,410,378
FLUID COUPLING WITH FLUID OPERATED MODULATED CLUTCH
Filed Feb. 27, 1967   5 Sheets-Sheet 2
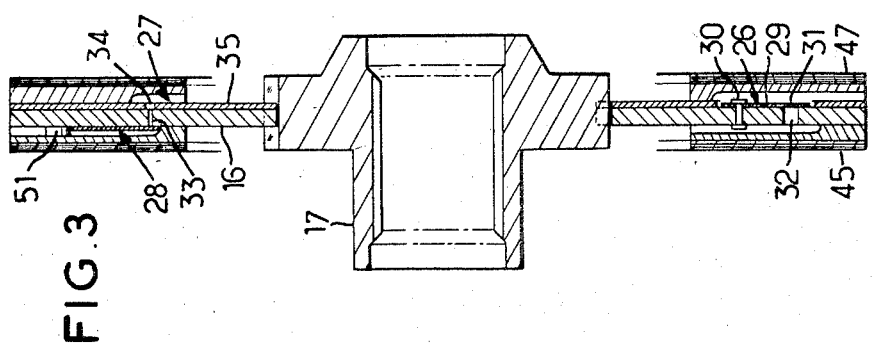
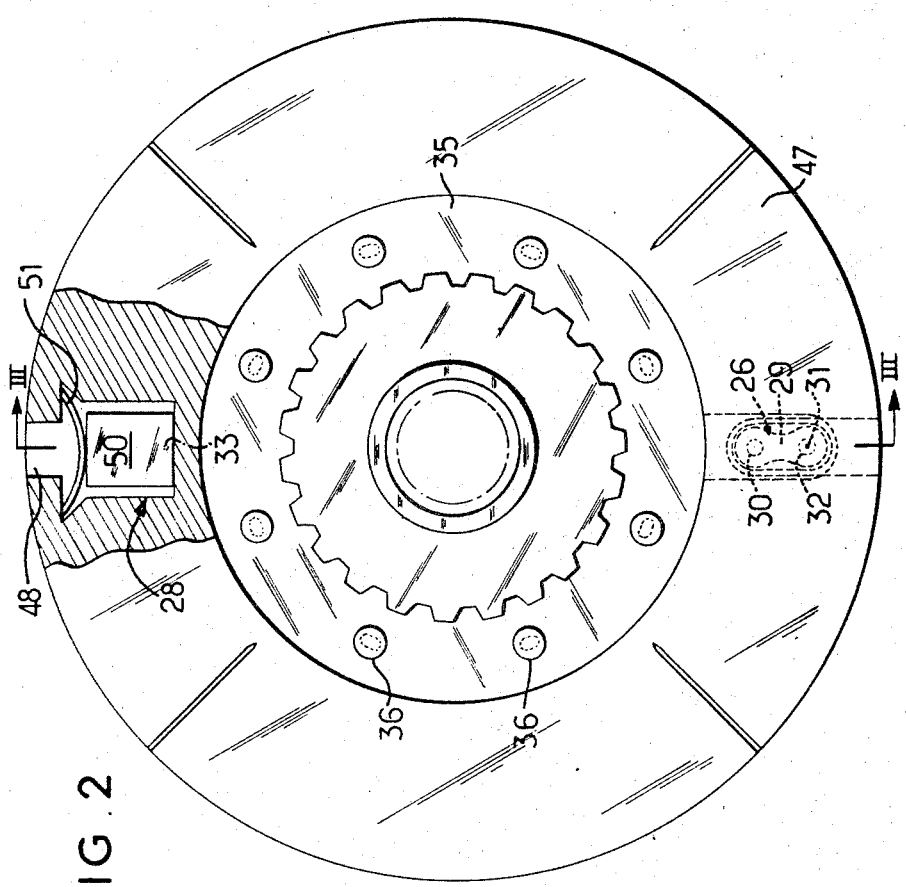
INVENTOR
JEAN MAURICE
By Young + Thompson
ATTYS.

Nov. 12, 1968 J. MAURICE 3,410,378
FLUID COUPLING WITH FLUID OPERATED MODULATED CLUTCH
Filed Feb. 27, 1967 5 Sheets-Sheet 3
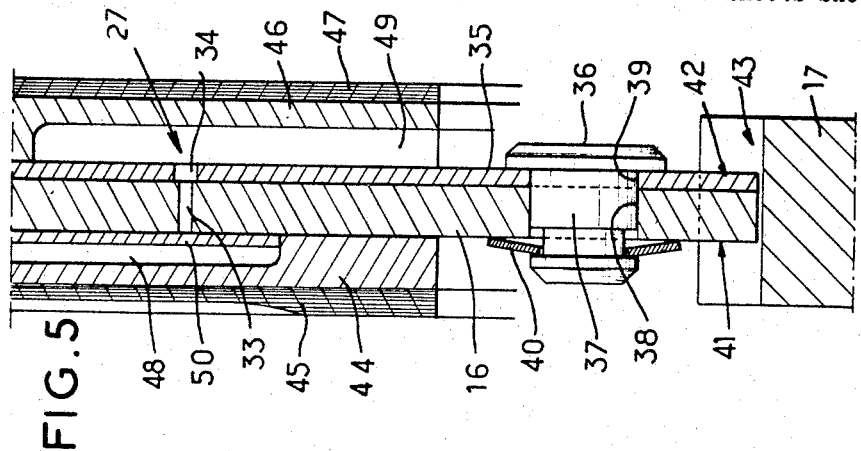
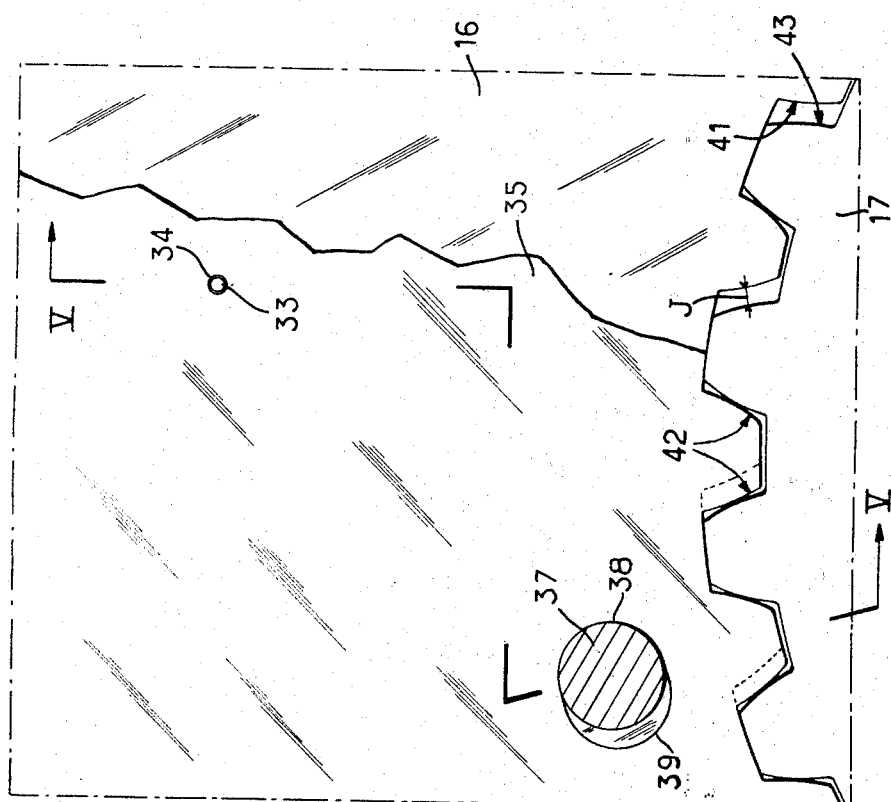
INVENTOR
JEAN MAURICE
By Young & Thompson
ATTYS.

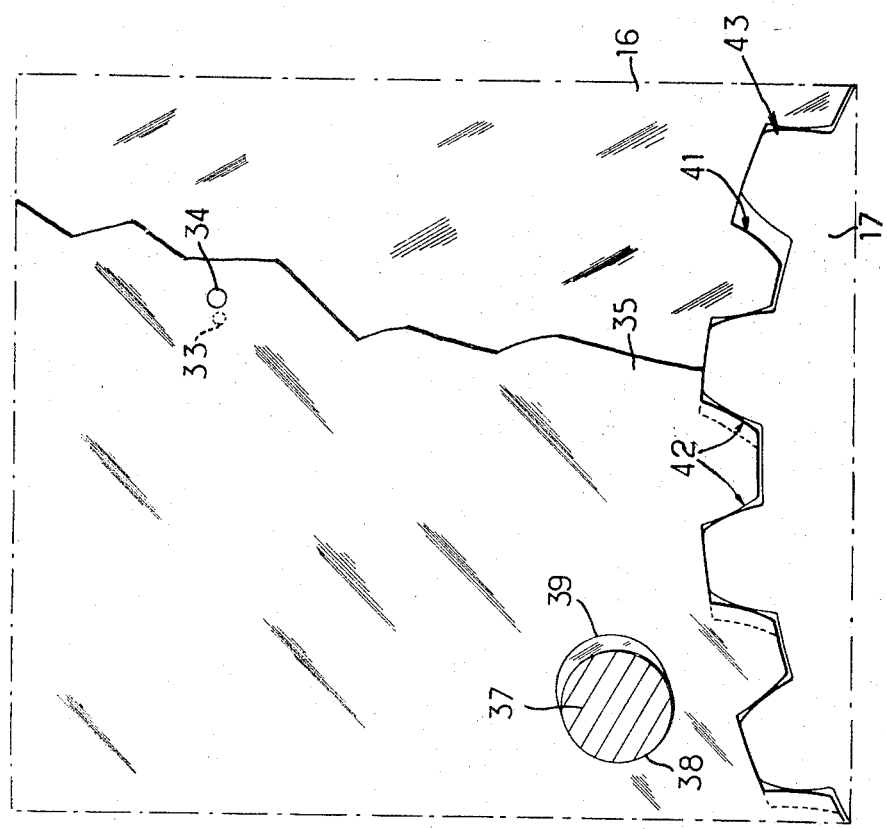

Nov. 12, 1968    J. MAURICE    3,410,378
FLUID COUPLING WITH FLUID OPERATED MODULATED CLUTCH
Filed Feb. 27, 1967    5 Sheets-Sheet 5
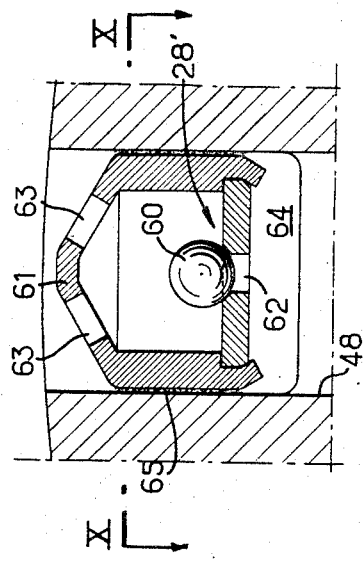
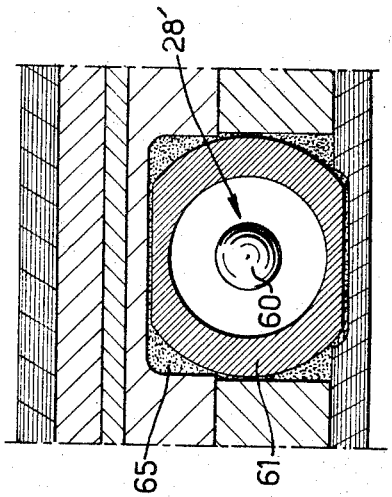
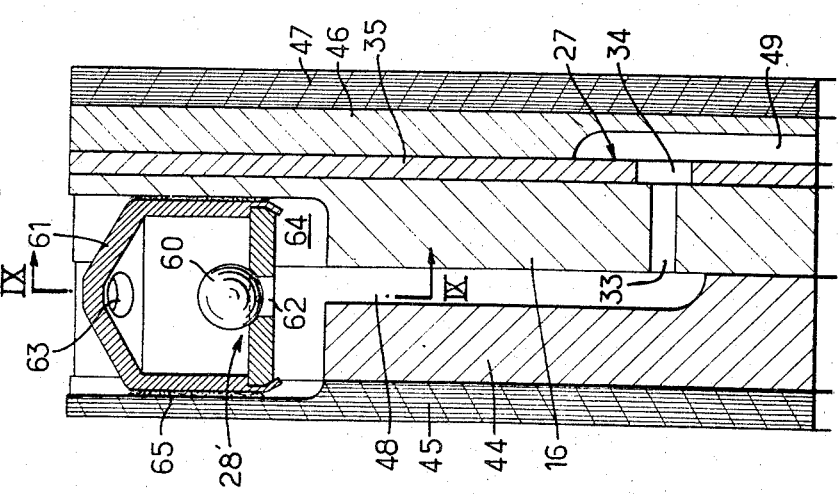
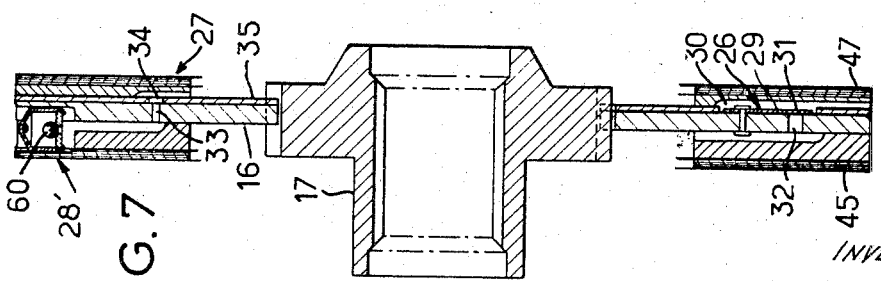
INVENTOR
JEAN MAURICE
BY Young + Thompson
ATTYS United States Patent Office 3,410,378
Patented Nov. 12, 1968

3,410,378
FLUID COUPLING WITH FLUID OPERATED
MODULATED CLUTCH
Jean Maurice, Paris, France, assignor to Societe Anonyme
Francaise du Ferodo, Paris, France, a corporation of
France
Filed Feb. 27, 1967, Ser. No. 618,822
Claims priority, application France, Mar. 3, 1966,
51,807
13 Claims. (Cl. 192—3.33)

ABSTRACT OF THE DISCLOSURE

The friction disc of a clutch is immersed in a fluid such as oil, and is provided with valves which control the passage of the oil into the disc at the level of the friction linings of the disc, in order to control the progressiveness of the engagement and disengagement of the clutch. One of the valves is a centrifugal valve mounted in series with a second valve controlled in dependence on the direction of transmission of the torque between the friction disc and its hub, and is intended to prevent any abrupt engagement at the moment of starting.

---

The present invention is concerned with clutches, especially for automobile vehicles, comprising two driving plates fixed together for rotation, one of which constitutes a cylinder receiving another which forms a piston, at least one of these plates being axially movable, a friction disc mounted on a hub coupled to a receiving shaft, said disc being arranged between the plates and being provided bilaterally with annular friction linings, the external diameter of which is less than the diameter of the plates, a chamber external to the plates, filled with fluid and partly defined by the axially-movable plate, an internal chamber filled with fluid and extending between the plates, a so-called peripheral region of the internal chamber surrounding the said linings, while another region of the internal chamber, called the central region, is surrounded by the said linings, the disc being elastically compressible in an axial direction in the zone of the linings, so that the said linings generally maintain a division between the two regions of the internal chamber during a pre-determined travel of engagement, during which the axially-movable plate is permitted to approach the other plate between a position of first contact of the linings and a fully-applied position of the linings, fluid-pressure means operatively connected to the external chamber and to the central region of the internal chamber and controlled at will so as to make the pressure effects preponderant on one side or the other of the said axially-movable plate for the purpose of selectively causing engagement or de-clutching, fluid passage means formed in the friction disc level with the linings of said disc so as to couple together the two regions, peripheral and central, of the internal chamber, and means for controlling the said passage means.

The invention has for its object improvements in clutches of the above type, which ensure great progressiveness of engagement, favourable to comfort, when the vehicle is stopped or almost stopped, at the same time avoiding any delay in engagement when the vehicle is running sufficiently fast.

The improvements according to the invention are especially characterized in that the control means of the fluid passage means of the friction disc comprise means responsive to centrifugal force. These means responsive to centrifugal force comprise a valve which cooperates with at least a part of the section of the passage means.

This valve is open when the friction disc rotates at a speed higher than a predetermined value of speed, and is closed when the friction disc is stopped or rotates at a speed less than the said predetermined value.

In one form of construction, the centrifugal valve comprises a plate which is capable of sliding radially in a housing of the friction disc and which forms a shutter associated with a hole. Elastic means preferably cooperate with the centrifugal valve and tend to restore it to the closed position.

In an alternative form, the centrifugal valve comprises a ball engaged in a cage which is provided with an opening forming a seat at its extremity directed towards the shaft of the disc, and which, at its extremity directed towards the periphery, comprises continuous communication means with the exterior of the disc. By way of example, with an internal cage diameter of the order of 6 mm., the diameter of the ball (which is of steel) is comprised between 2 mm. and 5 mm. and is preferably in the vicinity of 2.5 mm.

According to another characteristic feature, irrespective of its form, the centrifugal valve is conjointly operated with a clapper-valve controlled in dependence on the direction of transmission of the torque between the friction disc and the hub of this disc, so as to cause the useful section of the passage means to increase when the disc tends to drive the hub, that is to say in the direct sense, and to be greater than when the hub tends to drive the disc, that is to say in the reverse sense. The centrifugal valve and the valve control by the direction of transmission of the torque are mounted in series in the passage means.

The present invention has also for its object improvements in clutches, more particularly directed to the construction of the disc and of the valve controlled by the direction of transmission of the torque, it being possible within the scope of the invention to adopt these improvements either separately or preferably in combination with the improvements described above.

Following this other aspect of the invention, means for controlling the fluid passage means in the friction disc comprise a valve controlled in dependence on the direction of transmission of the torque and having two holes which are formed respectively in the friction disc and in a backing disc mounted against the said friction disc, and which are intended to be brought into either coincidence for the purpose of opening, or displacement for the purpose of closure.

The disc and the backing disc are preferably mounted with respect to each other with a relative freedom of rotation which permits them to have angular play, and are provided with teeth which are engaged in teeth formed in the hub, one of them being mounted with play and the other without play.

In addition, according to the invention, the control means for the passage means further comprise a valve with an orientated pressure drop, adapted to make the useful section of the passage means greater when the fluid tends to flow from the central region to the peripheral region of the internal chamber, that is to say at the moment of declutching, than when the fluid tends to flow from the peripheral region to the central region of the internal chamber, that is to say at the moment of engagement of the clutch. The valve with an orientated pressure drop is preferably mounted in parallel with the centrifugal valve in the fluid-passage means of the friction disc.

The invention has also for its object clutches provided with the above-ementioned improvements and a transmission having a hydrokinetic coupling device, such as a torque converter or a coupler, of which one turbine wheel is coupled for rotation to the plates of a clutch of the kind referred to.

Forms of embodiment of the invention are described below by way of example, reference being made to the accompanying drawings, in which:

FIG. 2 is a view to a larger scale, in elevation with parts in cross-section, of a friction disc of a clutch of the transmission;

FIG. 3 is a corresponding view in cross-section, taken along the line III—III of FIG. 2;

FIG. 4 is a view to a still larger scale, of a part of the disc comprising two elements having an angular play, one with respect to the other, and occupying a position in which two small holes are brought into coincidence in order to provide a fluid passage;

FIG. 5 is a corresponding view in cross-section, taken along the broken line V—V of FIG. 4;

FIG. 6 is a view similar to that of FIG. 4, but in which the two elements having a relative angular play occupy a position in which the two small holes are displaced so as to prevent the passage of fluid;

FIG. 7 is a view similar to that of FIG. 3, but showing a friction disc which comprises an alternative form of centrifugal valve;

FIG. 8 is a view of this alternative construction to a larger scale;

FIG. 9 is a view of the alternative form in crosssection, taken along the line IX—IX of FIG. 8;

FIG. 10 is a view of the said alternative in cross-section, taken along the line X—X of FIG. 9.

Figure 1:
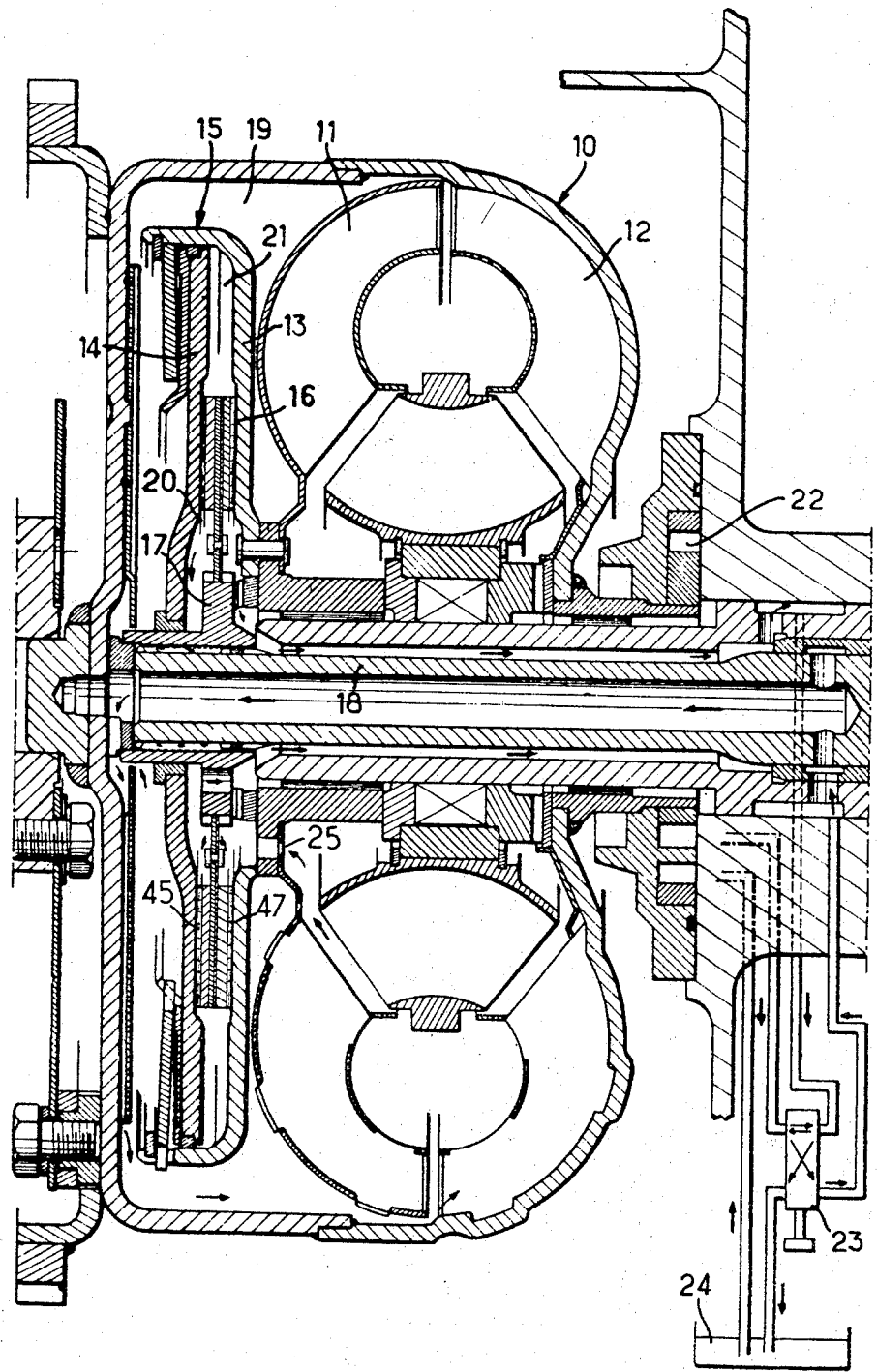
FIG. 1 is a view in longitudinal section of a transmission comprising improved valves according to the invention.

Reference will first be made to FIG. 1 which is concerned, by way of example only and without limitation, to an application of the invention to a transmission, especially for an automobile vehicle, having a hydrokinetic coupling device 10, such as a torque converter or coupler (a torque converter in the example shown), of which the turbine-wheel 11, driven hydraulically by the impeller-wheel 12, is coupled for rotation to a pair of plates 13, 14 of a clutch 15, arranged with respect to each other in the relation of cylinder to piston and immersed in a fluid such as oil, the said plates 13, 14, being intended to grip between them a friction disc 16 which is coupled for rotation, through the intermediary of a hub 17, to the receiving shaft 18 of the transmission.

The disc 16 is provided on both sides with annular friction linings 45, 47, the external diameter of which is less than the diameter of the plates 13, 14. A chamber 19, external to the plates 13, 14, is filled with fluid and is partly defined by the axially-movable plate 14. An internal chamber, filled with fluid, extends between the plates 13 and 14 and comprises two regions 20 and 21. The so-called central region 20 is surrounded by the linings 45 and 47, while the so-called peripheral region 21 surrounds the linings 45 and 47.

The disc 16 is elastically compressible in an axial direction in the zone of the linings 45 and 47, so that the linings 45 and 47 generally provide a barrier between the two regions 20 and 21 of the internal chamber 20, 21, during a predetermined travel of engagement, in which the axially-movable plate 14 is permitted to approach the plate 13, between a position of first contact of the linings and a position in which the linings are gripped.

The clutch 15 is operated, both for engagement and for declutching, by an oil circuit comprising a pump 22, a distributor 23 and a tank 24. In one position of the distributor 23, the oil under pressure supplied by the pump 22 enters the space 19 and then passes through the converter 10 and is permitted to pass through a calibrated orifice 25 with a high-pressure drop, into the region 20 in which the oil is no longer under pressure and returns to the tank 24. As the pressure is higher in the space 19 than in the space 20, 21, the clutch 15 is engaged.

In another position of the distributor 23, the oil under pressure supplied by the pump 22 passes into the region 20 and can at first only pass from the region 20 to the region 21 through the intermediary of three clapper valves 26, 27 and 28 (FIGS. 2 and 3), mounted on the disc 16. The space 19 is then connected to the tank 24. As the pressure is higher in the space 20, 21 than in the space 19, the clutch 15 is disengaged.

The valve 26 is a valve with an orientated pressure drop, and permits a large flow-rate when the fluid passes from the region 20 to the region 21, in order to permit of rapid declutching, while the valve 26 only permits a small flow to pass when the fluid flows from the region 21 to the region 20, in order to make the engagement operations gradual.

The valve 26 comprises for example a blade 29 which is fixed to the disc 16 by a rivet 30, and which can be applied against the disc or be separated therefrom, depending on whether the clutch is engaged or disengaged. The blade 29 is provided with a small orifice 31 which is operative during the engagement of the clutch, whereas during declutching, the blade 29 moves away and frees a large orifice 32 formed in the disc 16.

The valve 27 is controlled in dependence on the direction of transmission of the torque between the disc 16 and the hub 17 so as to be open when the disc 16 tends to rotate faster than the hub 17, and to be closed when the hub 17 tends to rotate faster than the disc 16. The valve 27 is thus enabled to render the engagement less progressive in the operations of the clutch following a change-up of gear than in the clutch operations following a changing-down of gear, this being in order to avoid any excessive delay in direct operation or pulling, and to prevent any slip of the driving wheels during operations in reverse or braking with the engine.

The valve 28 is mounted in series with the valve 27 and is controlled by centrifugal force with an elastic control so as to be open when the disc 16 rotates at a speed higher than a predetermined value, and to be closed when the disc 16 is stopped or rotates at a speed lower then the said predetermined value. This predetermined value of speed is chosen to be low and is for example of the order of 300 revolutions per minute.

The valve 26 thus enables the valve 27 to operate in the normal manner when the vehicle is moving, but it increases the progressiveness of engagement when the vehicle is stopped or almost stopped.

In more detail, the valve 27 is formed by means of two small holes 33 and 34, the first of which is formed in the disc 16 and the second in a backing disc 35 mounted against the disc 16, and which are intended to be brought either into coincidence, as shown in FIG. 4, for the purpose of opening, or into displacement, as shown in FIG. 6, for the purpose of closure.

The backing disc 35 is mounted on the disc 16 by means of a series of rivets 36, the rod 37 of which passes through a round role 38 in the disc 16 and an ovalized hole 39 in the backing disc 35, so as to permit a predetermined angular play between the discs 16 and 35. Each rivet 36 is preferably provided with an elastic washer 40 intended to ensure an appropriate mutual application of the discs 16 and 35.

The disc 16 comprises a set of teeth 41 engaged with a play J in a set of teeth 43 on the hub 17, while the backing disc 35 comprises teeth 42 engaged without play in the teeth 43 of the hub 17. The play J is slightly less, in angular value, than the play provided by the rivets 36 between the discs 16 and 35, in order that these rivets do not interfere with the operation.

The disc 16 is provided with an intermediate lining 44 which is in turn covered by a friction lining 45, while the backing disc 35 is provided with an intermediate lining 46 which is covered with a friction lining 47.

A passage 48 is provided in the intermediate lining 44 of the disc 16 to provide a communication between the region 21 and the hole 33, while a passage 49 is formed in the intermediate lining 46 of the backing disc 35 so as to provide a communication between the region 20 and the hole 34.

The valve 28 comprises a plate 50 which is arranged in the passage 48 and which cooperates with the hole 33. The plate 50 is further associated with a blade spring 51 which tends to hold it in front of the hole 33. The plate 50, responsive to centrifugal force, is lifted against the action of the spring 51 and uncovers the hole 33 when the disc 16 rotates at a sufficient speed. For example, the valve has a width of the order of ten to fifteen millimeters; its length is a function of the dimensions of the disc 16 and of the position of the hole 33.

When the disc 16 tends to rotate faster than the hub 17, the play J is absorbed in the direction indicated in FIG. 4. The two holes 33 and 34 are in coincidence, and the valve 27 is open.

If the disc 16 has a speed higher than the predetermined value mentioned above, the plate 50 uncovers the hole 33. The two valves in series 27 and 28 are open.

At the moment of engagement, a flow of oil is permitted to pass from the region 21 to the region 20 through the passage 48, the two holes 33 and 34, and the passage 49, which avoids any delay during engagement of the clutch.

If the disc 16 is stopped or rotates at a speed less than the said predetermined value of speed, the spring 51 holds the plate 50 in front of the hole 33, which closes the valve 28 in front of the open valve 27. The pressure in the chamber 21 tends to apply the plate 50 against the hole 33 in a fluid-tight manner, which ensures the closure.

By this means, excessively abrupt engagements are prevented when stopped, which would be liable to cause discomfort.

When the disc 16 tends to rotate less rapidly than the hub 17, the play J is absorbed in the other direction, that is to say the direction shown in FIG. 6. The two holes 33 and 34 are displaced with respect to each other and the valve 27 is closed. No flow of oil is permitted to pass from the region 21 to the region 20 through the holes 33 and 34, which is favourable to the progressiveness of engagement during changing-down through the gears.

Reference will now be made to FIGS. 7 to 10, which relates to an alternative form of the centrifugal valves 28 of FIGS. 2 and 3. This alternative form of valve, indicated by 28', instead of comprising a plate 50 consists of a ball 60 which is housed in a cage 61 having, at its extremity directed towards the axis of the disc, an opening 62 forming a seating and communicating with the passage 48. At its extremity directed towards the periphery of the disc, two openings 63 jointly provide a continuous communication with the exterior of the disc.

The cage 61 is housed in a recess 64 formed for that purpose in the parts 45, 44 and 16, and is held therein by any appropriate means, for example by sticking at 65.

Similarly to the valve 28, the valve 28' is mounted in series with the valve 27 and is closed or open, depending on whether the speed of the disc 16 is less than a predetermined value, for example of the order of 300 revolutions per minute.

When the clutch is disengaged, upon its reengagement, oil tends to pass out of the chambers 21 and 20 and is returned to the tank 24.

When the plates 13 and 14 both touch the disc 16 and when the oil from the chamber 21 can no longer pass except by the valves of the disc, the pressure in the chamber 21 is permitted to rise above that of the chamber 20.

If the disc 16 rotates at a speed higher than the predetermined value of 300 revolutions per minute, the ball 60 is centrifuged with an effect such that the centrifugal force is preponderant to all the other forces in action. The ball 60 uncovers the seating 62 and is brought into the vicinity of the holes 63, of which at least one necessarily remains open. The valve 28' is open.

If the disc 16 tends to rotate faster than the hub 17, the valve 27 is also open and, at the moment of engagement, a flow of oil is allowed to pass from the region 21 to the region 20 through the passages 48 and 49, which avoids any slowness of operation during engagement of the clutch.

If the disc 16 rotates at a speed less than 300 revolutions per minute or if it is stopped, the ball 60 may either be on the seating 62 or it may be away from it.

If the ball 60 is on the seating, it is held in that position by the pressure of the chamber 21. If the ball 60 is not on its seating, its presence in the cage 61 only leaves a small section for the flow permitted by the valve 27, which creates a drop in pressure at the level of the ball and this latter, acted upon by a pressure which is higher on the upstream than on the downstream side, is brought on to the seating 62 and causes the closure of the valve 28'.

By this means, excessively abrupt engagements are prevented while stationary, which would be liable to cause discomfort.

The specific weight of the ball 60 and also its diameter and the internal diameter of the cage 61 must be such that the preponderance of the centrifugal force or of the opposing force due to the pressure drop is effectively obtained above or below the desired value of speed, for example 300 revolutions per minute.

Good results have been obtained with a ball 60 of steel, having a diameter of 2.5 mm., and a cage 61 having an internal diameter of 6 mm. Satisfactory results have also been obtained when, all other things being equal, the diameter of the ball 60 is comprised between 2 mm. and 5 mm. By way of example, the diameter of the seating 62 may be of the order of 1.5 mm. and the diameter of each hole 63 of the order of 2 mm.

It will of course be understood that the invention is not limited to the forms of construction described and shown, but includes all its alternative forms, in particular an alternative in which the plate 50 is provided with a hole having a section less than that of the hole 33 and which comes opposite this latter in the position of closure of the valve 28, etc.

What I claim is:

1. A clutch comprising two driving plates fixed together for rotation, of which one constitutes a cylinder and receives the other forming a piston, at least one of said plates being movable axially, a friction disc mounted on a hub coupled to a receiving shaft, said disc being disposed between said plates and being provided on both sides with annular friction linings, the external diameter of which is less than the diameter of the plates, a chamber external to said plates, filled with fluid and partly defined by said axially-movable plate, an internal chamber filled with fluid extending between said plates, a so-called peripheral region of said internal chamber surrounding said linings while another so-called central region of the internal chamber is surrounded by said linings, the disc being elastically compressible in an axial direction in the zone of said linings, so that said linings generally maintain a barrier between the two regions of the internal chamber during a predetermined travel of engagement in which the axially-movable plate is permitted to approach the other plate between a position of first contact of the linings and a gripped position of said linings, fluid-pressure means operatively coupled to said external chamber and to the central region of said internal chamber and actuated at will in order to make the pressure effects preponderant on one side or on the other of said axially-movable plate so as to cause selectively the engagement or disengagement of the clutch, fluid-passage means formed in said friction disc at the level of the linings of said disc so as to connect the peripheral and central regions of said internal chamber to each other, and means for controlling said passage means, said clutch being characterized in that said control means comprise means responsive to centrifugal force.

2. A clutch as claimed in claim 1, in which said means responsive to centrifugal force comprise a valve adapted to cooperate with at least a part of the section of said passage means, said valve being open when the friction disc rotates at a speed higher than a predetermined value of speed and being closed when the friction disc is stopped or rotates at a speed lower than said predetermined value.

3. A clutch as claimed in claim 2, in which said centrifugal valve comprises a plate adapted to slide radially in a housing provided in said friction disc and which forms a shutter associated with an orifice.

4. A clutch as claimed in claim 2, in which elastic means are adapted to cooperate with said centrifugal valve and tend to return said valve to the closed position.

5. A clutch as claimed in claim 2, in which said centrifugal valve comprises a ball engaged in a cage, said cage being provided with an opening forming a seating at its extremity directed towards the axis of said disc and which comprises at its extremity directed towards the periphery, means for permanent communication with the exterior of said disc.

6. A clutch as claimed in claim 5, in which the internal diameter of said cage is of the order of 6 mm., said ball is of steel and has a diameter comprised between 2 mm. and 5 mm. and preferably in the vicinity of 2.5 mm.

7. A clutch as claimed in claim 2, in which said centrifugal valve is associated with a valve controlled in dependence on the direction of transmission of the torque between said friction disc and the hub of said disc, so as to make the useful section of said passage means greater when the disc tends to drive the hub, that is to say in the direct sense, than when the hub tends to drive the friction disc, that is to say in the reverse sense.

8. A clutch as claimed in claim 7, in which said centrifugal valve and said valve controlled in dependence on the direction of transmission of the torque are connected in series in said passage means.

9. A clutch as claimed in claim 7, in which said valve controlled in dependence on the direction of transmission of the torque comprises two orifices which are formed respectively in the friction disc and in a backing disc mounted adjacent said friction disc, and which are intended to be brought either into coincidence for the purpose of opening or in staggered relation for the purpose of closure.

10. A clutch as claimed in claim 9, in which said friction disc and said backing disc are mounted with a relative freedom of rotation with respect to each other, thus permitting relative angular play and are provided with teeth which are engaged in teeth formed in the hub of the disc, one set of teeth being mounted with play and the other set of teeth without play.

11. A clutch as claimed in claim 1, in which said means for controlling the passage means further comprise a valve having an orientated pressure drop adapted to make the useful section of said passage means greater when the fluid tends to flow from the central region to the peripheral region of said internal chamber, that is to say at the moment of declutching, than when the fluid tends to flow from the peripheral region to the central region of said internal chamber, that is to say at the moment of engagement of said clutch.

12. A clutch as claimed in claim 11, in which said valve having an orientated pressure drop is mounted in parallel with the centrifugal valve in said passage means.

13. A transmission comprising a hydrokinetic coupling device such as a torque converter or a coupler, in which one turbine wheel is coupled in rotation to the plates of a clutch as claimed in claim 1.

References Cited

UNITED STATES PATENTS

| 2,404,657 | 7/1946 | Roberts et al. | 192—103 |
| 3,213,988 | 10/1965 | Maurice et al. | 192—109 |
| 3,228,503 | 1/1966 | Maurice | 192—3.33 X |

BENJAMIN W. WYCHE, III, *Primary Examiner.*